(No Model.) 2 Sheets—Sheet 2.

W. CHRISTIE.
PUMP MOTOR.

No. 366,203. Patented July 12, 1887.

Witnesses:
A. Maritzen
Edward _____

Inventor:
William Christie
By Wm H Lotz
Attorney.

UNITED STATES PATENT OFFICE.

WILLIAM CHRISTIE, OF WHEATON, ILLINOIS.

PUMP-MOTOR.

SPECIFICATION forming part of Letters Patent No. 366,203, dated July 12, 1887.

Application filed April 12, 1887. Serial No. 234,543. (No model.)

*To all whom it may concern:*

Be it known that I, WILLIAM CHRISTIE, a citizen of the United States of America, residing at Wheaton, in the county of Du Page and State of Illinois, have invented certain new and useful Improvements in Pump-Motors, of which the following is a specification, reference being had therein to the accompanying drawings.

This invention has for its object to provide a motor for farmers' use that will take the place of a windmill for pumping water from the well in quantities as may be needed for the different purposes, thereby doing away with a tank, in which the water is apt to become stagnated and putrid during summertime, and is liable to freeze during wintertime.

My invention principally consists of a pump driven by a weight through the transmission of a train of gearing arranged to be on a horizontal plane, and placed upon a wooden frame tower, and in combination therewith of a winding-gear situated in the base of such tower, and connected with the gearing above by an endless link belt, all as will be more fully hereinafter described and specifically claimed.

Figure 1:
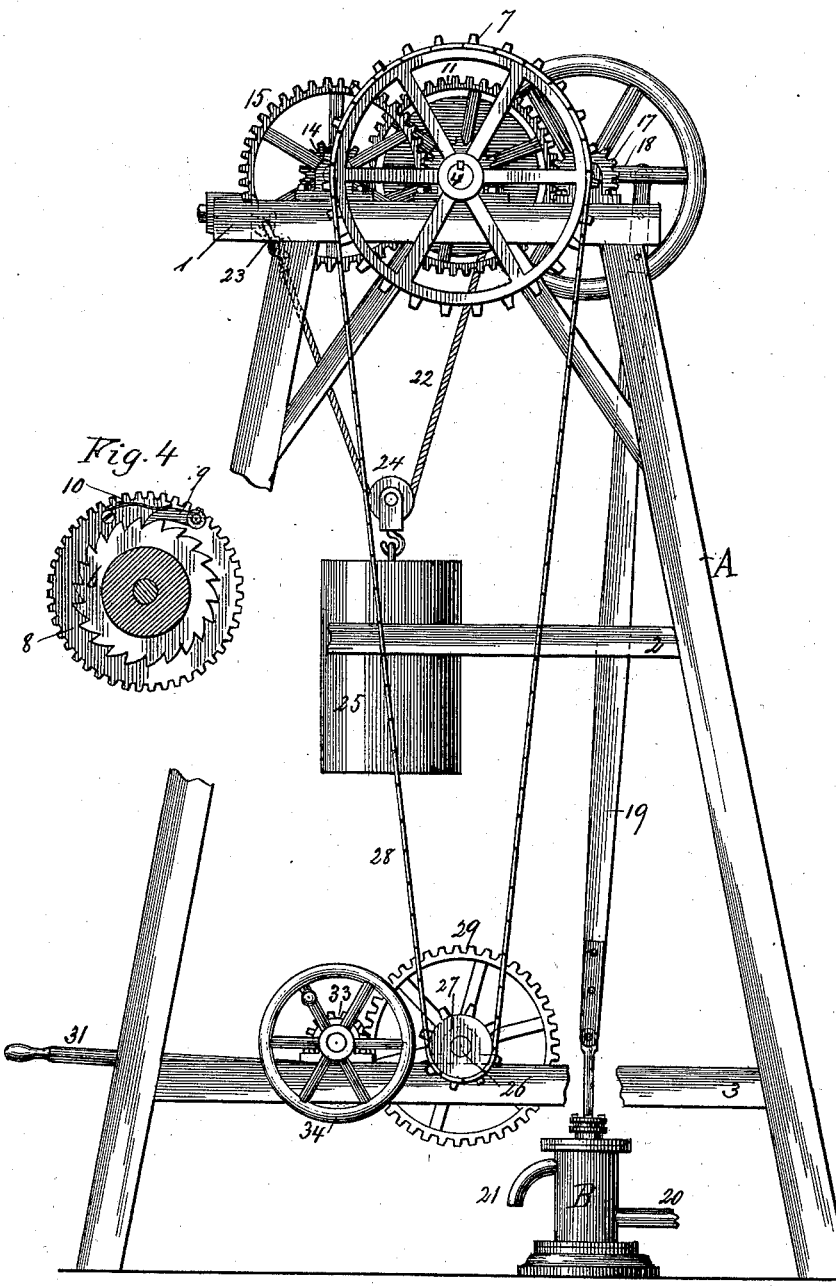
Figure 2:
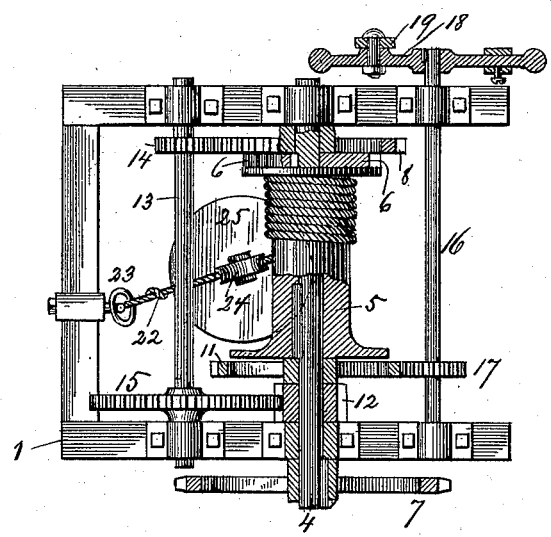
Figure 3:
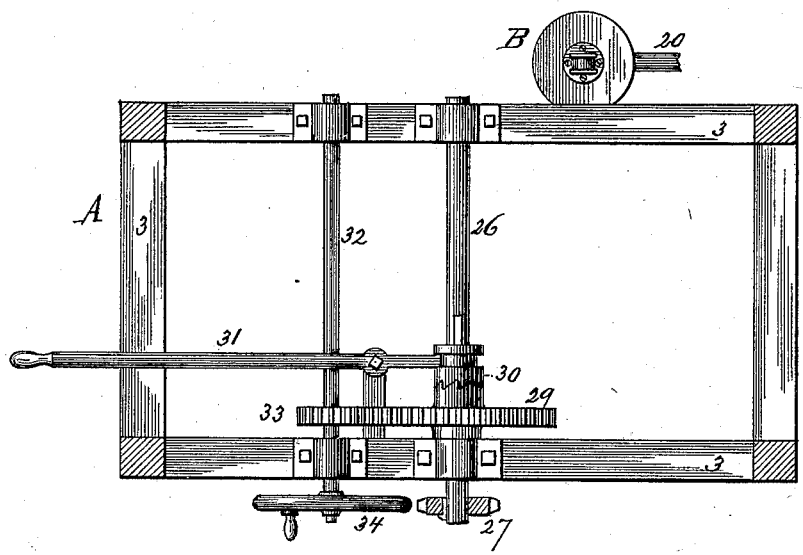

In the accompanying drawings, Figure 1 represents an elevation of the device; Fig. 2, a sectional plan of the arrangement of the pump-driving gears; Fig. 3, a plan of the winding-gears, and Fig. 4 a cross-section of the spool with ratchet-wheel and main driving-gear.

Corresponding referential characters in the several figures of the drawings designate like parts.

A denotes the frame of the motor, consisting of pyramidically-placed uprights supporting a square top frame, 1, and being connected by beams 2 and 3, for steadying it. Across about the center of frame 1 is placed main shaft 4, journaled in suitable pillow-blocks secured upon such frame, and upon this shaft 4 are rigidly mounted the spool 5, the ratchet-wheel 6, and the sprocket-wheel 7, and adjacent to ratchet-wheel 6 is loosely sleeved the main spur-gear 8, having attached to its rim the pawl 9, depressed by a spring, 10, to engage the ratchet-teeth of wheel 6, and thereby locking such main wheel 8 to turn with the spool in one direction, but to be disengaged on the opposite direction, and between the opposite end of the spool 5 and the journal-box are loosely sleeved upon such shaft 4 the spur-wheel 11 and pinion 12, to be rigid with each other. A second shaft, 13, is placed to one side of shaft 4, to be parallel therewith, and is journaled in suitable boxes, also secured upon frame 1. Upon one end of this shaft 13 is rigidly mounted a pinion, 14, the teeth of which mesh with the teeth of spur-wheel 8, and upon the opposite end of shaft 13 is rigidly mounted a spur-wheel, 15, the teeth of which mesh with the teeth of pinion 12. A third shaft, 16, is placed to the other side of shaft 4, also to be parallel therewith, and is journaled in suitable boxes secured upon frame 1, and upon this shaft is rigidly mounted a pinion, 17, the teeth of which mesh with the teeth of spur-wheel 11, and upon one overhanging end of this shaft 16 is mounted the crank 18, that by a pitman, 19, connects with the rod of the plunger or piston of pump B, that may be of any well-known construction, to be single or double acting. This pump B may be placed in or above the well, with its suction-pipe 20 extending below the water-line in such well, and with its discharge-pipe 21 connected to a train of pipes leading to the several faucets where water is to be drawn. A rope, 22, is secured with one end to the spool 5, and with its opposite end to a hook or eye, 23, fixed to frame 1, and to a sheave, 24, hanging in such rope 22, is suspended the weight 25, which by its gravity will turn the spool 5, and therewith the gear-wheel 8, which again drives pinion 14, and therewith wheel 15, that driving pinion 12, and therewith wheel 11, which again will drive pinion 17, and therewith the crank-shaft 16, thus multiplying the speed from shaft 4 to shaft 16 by three different sets of gear-wheels, and thereby obtaining a large number of strokes for the pump-plunger from a very slow movement of the spool, all by very simple means and with very few shafts.

Upon the lower beams, 3, of frame A is journaled, in suitable boxes secured thereon, a shaft, 26, upon the overhanging end of which is mounted a small sprocket-wheel, 27, that by an endless link belt, 28, is connected with the sprocket-wheel 7 of shaft 4. Upon this shaft 26 is also loosely sleeved a spur-wheel, 29, having clutch-teeth at one end of its hub for engagement with a shifting clutch coupling, 30, feathered upon shaft 26, and reciprocated by a lever, 31, and upon another shaft, 32, placed parallel with shaft 26, and journaled in boxes, also secured upon beams 3, is rigidly mounted a pinion, 33, the teeth of which mesh with the teeth of wheel 29, and upon its overhanging end this shaft 32 has mounted a crank-wheel, 34. With turning crank-wheel 34 the spool 5 is rotated for winding the rope 22 thereon, and thereby hoisting weight 25, and then by shifting clutch 30 to be out of engagement with wheel 29 the crank-shaft 32 will remain stationary, while the weight 25, by its gravity, will operate the pump until such weight has reached the ground again to be rehoisted. With this arrangement no brake will be required for stopping the motor while pumping is not desired, because the pump itself will act as the brake, since, as long as no water is allowed to escape from the discharge-pipes by closing the faucets to the ends thereof, the pump-plunger is retarded by the water in such pump; but as soon as a faucet is opened the pump will work with the necessary speed proportional to the flow of water desired, thus supplying the water directly from the well to be cool and fresh.

What I claim is—

1. The combination of the main shaft 4, rigid spool 5, ratchet-wheel 6, sprocket-wheel 7, loosely-mounted spur-wheel 8, pawl 9, the wheels 11 and 12, shaft 13, pinion 14, wheel 15, shaft 16, pinion 17, crank 18, pitman 19, and the rope and weight connected to the drum, the whole being constructed and arranged substantially as set forth.

2. The combination, with shaft 4 and sprocket-wheel 7 on top of the frame, of shaft 26, sprocket-wheel 27, and loosely-sleeved gear-wheel 29, arranged to be made rigid with the shaft by a shifting clutch, 30, operated by a lever, 31, said clutch, shaft 32, pinion 33, and crank-wheel 34 all within the lower part of the frame, and the sprocket-wheels 7 and 27, and endless link-belt 28, substantially as set forth, for the purpose specified.

In testimony whereof I affix my signature in presence of two witnesses.

WILLIAM CHRISTIE.

Witnesses:
WILLIAM H. LOTZ,
A. MARITZEN.